Figure 1:
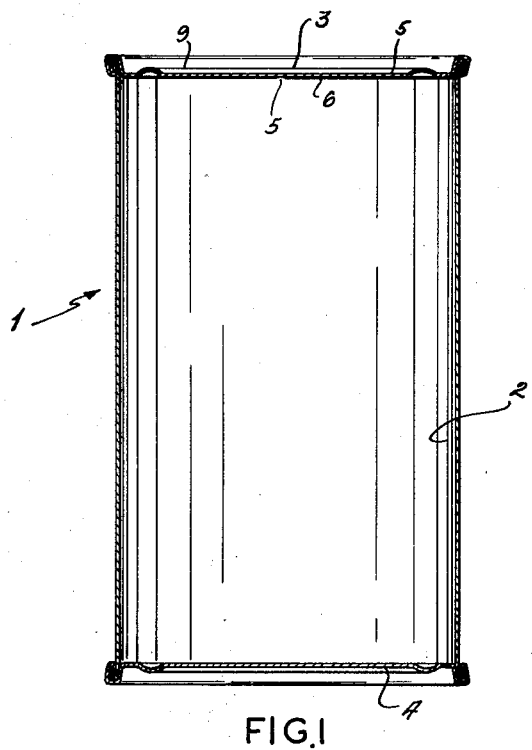

Oct. 13, 1964   J. SCHWAIGER   3,152,717
CARBONATED BEVERAGE CAN
Filed July 20, 1962

INVENTOR:
JOSEPH SCHWAIGER
BY Gravely, Lieder & Woodruff
ATTORNEYS.

United States Patent Office 3,152,717
Patented Oct. 13, 1964

3,152,717
CARBONATED BEVERAGE CAN
Joseph Schwaiger, Sappington, Mo., assignor to Anheuser-Busch, Incorporated, St. Louis, Mo., a corporation of Missouri
Filed July 20, 1962, Ser. No. 211,248
6 Claims. (Cl. 220—64)

This invention relates to a novel container or can for carbonated beverages, particularly beer, and also to a method for controlling the corrosion which normally occurs within such a container when filled with a carbonated beverage or other food product.

In the past, most beverage cans have been made entirely from tin-plated steel and have consisted of a cylindrical shell or body with circular ends or lids suitably secured thereto. The body and the lids were made from tin-plated steel material with a suitable inner coating to prevent the beer from coming into direct contact with the base metal.

In such a carbonated beverage can, the steel base is anodic, the tin cathodic, and the beverage is the electrolyte. If there is any imperfection of discontinuity in the inner coating, or if such should occur, a galvanic current sets in resulting in the dissolving of iron, which is harmful to the beverage. Furthermore, even sound coatings have a certain degree of porosity and a tendency to behave as a semi-permeable membrane. The electrolytic qualities of the carbonated beverages are those of a weak acid and are intensified by the presence of reducible components (such as depolarizers which are found in beer).

The constant galvanic electromotive force dissolves the iron which acts as a catalyst for undesirable oxidation of the carbonated beverage. This happens to a greater extent if air is present. During storage of the can, this corrosion process progressively continues. The dissolved iron imparts a metallic-iron taste to canned beer over a period of time and acts as a catalyst for detrimental oxidative changes in the carbonated beverage. Iron contents of 0.35 part per million (p.p.m.) dissolved from the can are usually detectable by taste and spoil the beer.

The principal object of the present invention is to increase the shelf life of carbonated beverages and to prevent iron from the tin-plated steel can to enter the beer or carbonated beverage in amounts sufficient to adversely affect the taste or spoil the beverage.

Another object is to provide a method for controlling the corrosion by using a sacrifical anode so positioned in the beer can that it will always be in direct contact with the beer regardless of the position of the can, that is, whether the can is on either end or on its side. Still another object is to provide an anode which is a portion of the can itself and which requires no additional handling or machinery for inclusion in the can, so that the present high speed automatic canning equipment now in use can be used without modification. A further object is to provide for the controlled dissolving of aluminum particles into the beverage in order to keep the harmful iron in other portions of the container from going into solution, thereby preserving and prolonging shelf life of the beverage.

These and other objects and advantages will become apparent hereinafter.

The present invention is embodied in a conventional or standard cylindrical container made primarily from the conventional tin coated steel heretofore in use as a container or "tin can," said container being of conventional size and dimensions so as to be capable of handling and loaded by existing high speed automatic equipment, said container having an aluminum portion thereon coated with a coating material on the inner surface thereof, there being a predetermined exposed area in the coating, for example of at least about 0.05 square inches, so that bare aluminum metal is in direct contact with the beverage at all times and in all positions of the container, said aluminum being capable of dissolving into the beverage in solution to prevent harmful iron from going into solution in the beverage due to any imperfection in the coating of the steel or tin-plated can.

Figure 2:
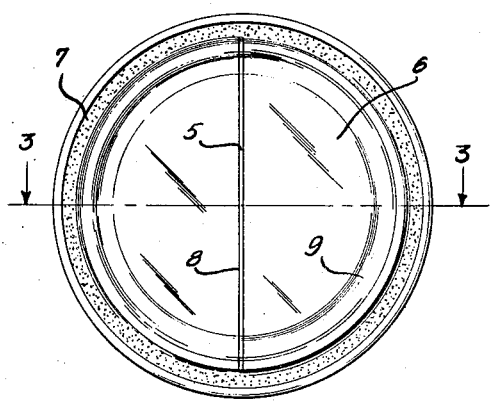
Figure 3:
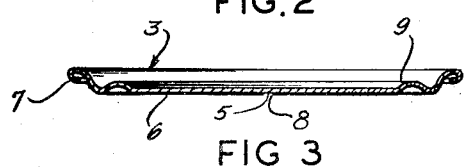

The invention further consists in the parts and in the arrangements and combinations of parts hereinafter described and claimed, as well as in the process. In the accompanying drawings which form part of this specification and wherein like numerals refer to like parts wherever they occur:

FIG. 1 is a vertical cross-sectional view taken along a diameter of a conventional beer can having at least one aluminum end, FIG. 2 is a plan view of the underside of the top lid embodying the present invention before it is crimped into assembled relation with the cylindical shell, and FIG. 3 is a cross-sectional view taken along line 3–3 in FIG. 2 showing a cross-section of said lid.

Referring now to the drawings in detail, FIG. 1 shows a conventional beverage can 1 having a cylindrical shell 2 and circular lids or ends 3 and 4. As best shown in FIGS. 2 and 3, the lid which embodies the present invention is made from aluminum 5 with an inner coating 6, there being a sealer 7 along the outer periphery of the inside surface to aid in forming a leakproof bead or connection between the lid 3 and the shell 2. The underface of the inner coating 6 is provided with a strip or line 8 where the coating 6 is omitted so that the bare aluminum metal 5 is open or exposed to the contents of the beverage can 1.

The conventional standard 12 ounce beer can is made from 60 to 75 pound tin-plated steel. It is cylindrical and has a diameter of about 2.571 inches and a height of about 4.812 inches. The ends or lids are circular and relatively flat but have a bead or curvature 9 thereon slightly inwardly of the outer edge thereof for strength. The inner surface of the cylindrical wall and each end is coated with an organic material, either a single coat or a top and base coat.

The present invention is embodied in a beverage can which utilizes the standard tin-plated cylindrical wall, but uses aluminum as the material for one or both ends. This material is preferably an aluminum alloy for strength and is about 1/1600 inches thick with the standard profile or cross-section taken along a diameter. The standard organic single or top and base coat is applied to the inner surface of the circular end, but there is no coating along a diameter of the lid along a straight path about 0.02 inch wide.

The uncoated strip along a diameter of one or both ends may be oriented in any fashion with respect to the standard longitudinal seam of the cylindrical body portion of the can. If aluminum ends are used at both ends of the can, the uncoated strip on one end may be parallel to or at angle to the strip on the other end.

It has been found that with an exposed area of about 0.05 square inch in the aluminum lid, there is an absence of iron in the beverage. After six months' storage at 77° F. reduction in iron contents of up to 75% were obtained. Although the aluminum content increases with age and is larger when the exposed area is larger, the iron content remains substantially the same and does not increase after a certain point. The flavor at various time intervals was satisfactory. With the beverages tested, it was found that their tolerance for aluminum is much greater than for iron.

The following table shows the storage conditions and a comparison between regular tin cans and tin cans having one aluminum lid with 0.05 square inch of aluminum exposed. The numbers in the following table refer to parts per million of aluminum and iron pickup in beer.

| Storage Condition | Regular Tin Can | | Regular Tin Can Body With Tin Plate End And One Aluminum End on Which 0.05 Square Inch Of Bare Aluminum Metal Was Exposed | |
|---|---|---|---|---|
| | Al | Fe | Al | Fe |
| 1 Month at 77° F | 0.1 | 0.09 | 0.1 | 0.05 |
| 3 Months at 77° F | 0.1 | 0.17 | 0.3 | 0.07 |
| 6 Months at 77° F | 0.2 | 0.46 | 0.6 | 0.12 |
| 1 Month at 100° F | 0.1 | 0.08 | 0.2 | 0.05 |
| 3 Months at 100° F | 0.2 | 0.34 | 0.6 | 0.13 |

The present invention may be used on cans of any size, such as 10, 11, 12, 15, 16, etc. ounce cans. As indicated, cans embodying the present invention are of conventional size and shape and may be handled by the high speed automatic equipment now available and in use for forming, filling, and handling the present standard or conventional cans. This new can is identical in all respects with conventional cans except that one or both ends are made from aluminum having an uncoated area on the inner surface thereof. This has been found to allow a predetermined amount of harmless aluminum to dissolve into the beverage in order to prevent the harmful iron or tin from dissolving into the beverage. The effect of this is to prolong shelf life of the beverage and to prevent any adverse effect with regard to the color and flavor of the beverage.

This invention is intended to cover all changes and modifications of the example of the invention herein chosen for purposes of the disclosure, which do not constitute departures from the spirit and scope of the invention.

What is claimed is:

1. A lid for a conventional tin-plated steel beverage can, said lid being made from aluminum and being provided with a coating over a major portion of its inside surface to prevent the beverage in said can from coming into direct contact with the aluminum in said lid, said coating having an opening therein to allow said beverage to come into direct contact with the aluminum in said lid over a small predetermined area sufficient to prevent an objectionable amount of iron from the beverage can wall from dissolving into said beverage.

2. A lid for a conventional tin-plated steel beverage can, said lid being made from aluminum and being provided with an inner coating to prevent the beverage from coming into direct contact with the aluminum in said lid, said coating having an opening therein of at least about 0.05 square inch to allow said beverage to come into direct contact with the aluminum in the lid, said opening being in the form of a straight line across a diameter of the lid.

3. A circular one-piece lid for a conventional tin-plated steel beverage can, said lid being made from aluminum and being provided with an inner organic coating to prevent the beverage from coming into direct contact with the aluminum in said lid, said coating having an opening therein of at least about 0.05 square inch to allow said aluminum in the lid to be exposed, said opening being in the form of a straight line across the diameter of the lid and of such area as to allow at least about 0.05 square inch of uncoated aluminum to be exposed to the beverage within the can.

4. A carbonated beverage can consisting solely of a lid at each of the two ends thereof with a tubular body therebetween, said tubular body made from a metal which contains iron and being provided with an inner coating material to prevent the carbonated beverage from coming into direct contact with the metal in said tubular body, at least one of said lids being made from aluminum, said aluminum lid having an inner coating thereon to prevent the carbonated beverage from coming into direct contact with the aluminum beneath said inner coating, said coating having an opening therein to allow said carbonated beverage to come into direct contact with the aluminum in the lid itself over a small predetermined area to allow sufficient aluminum to dissolve into the beverage to prevent an objectionable amount of iron in the tubular body from dissolving into said beverage.

5. A carbonated beverage can consisting solely of a lid at each of the two ends thereof with a tubular body therebetween, said tubular body made from tin-plated steel and being provided with an inner coating material to prevent the carbonated beverage from coming into direct contact with the metal in said tubular body, said lids being made from aluminum having an inner coating thereon to prevent the carbonated beverage from coming into direct contact with the aluminum beneath said inner coating, said coating having an opening therein of at least about 0.05 square inch to allow said carbonated beverage to come into direct contact with the aluminum in the lid itself.

6. A carbonated beverage can consisting solely of a lid at each of the two ends thereof with a tubular body therebetween, said tubular body made from tin-plated steel and being provided with an inner coating material to prevent the carbonated beverage from coming into direct contact with the metal in said tubular body, at least one of said lids being made from aluminum, said aluminum lid having an inner coating thereon to prevent the carbonated beverage from coming into direct contact with the aluminum beneath said inner coating, said coating having an opening therein of at least about 0.05 square inch to allow said carbonated beverage to come into direct contact with the aluminum in the lid itself, said opening being in the form of a straight line across a diameter of the lid.

References Cited in the file of this patent
UNITED STATES PATENTS

| 1,958,765 | Perkins | May 15, 1934 |
| 2,299,090 | Hothersall | Oct. 20, 1942 |